Nov. 12, 1929.                    C. L. KUCHA                    1,735,322
                                  MOWER GUARD
                               Filed April 7, 1928

C. L. Kucha
            Inventor
By C. A. Snow & Co.
            Attorneys.

Patented Nov. 12, 1929

1,735,322

UNITED STATES PATENT OFFICE

CHARLES L. KUCHA, OF ARTESIAN, SOUTH DAKOTA

MOWER GUARD

Application filed April 7, 1928. Serial No. 268,186.

This invention has reference to mower guards, and more particularly to the ledger plate thereof, the primary object of the invention being to provide a removable ledger plate, novel means being provided for securing the ledger plate in position to prevent the accidental displacement thereof.

Another important object of the invention is to provide a tapered securing pin to be driven through an opening in the guard to contact with the ledger plate, the guard being so constructed that the lower end of the pin may be bent rearwardly to lock the pin against movement.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
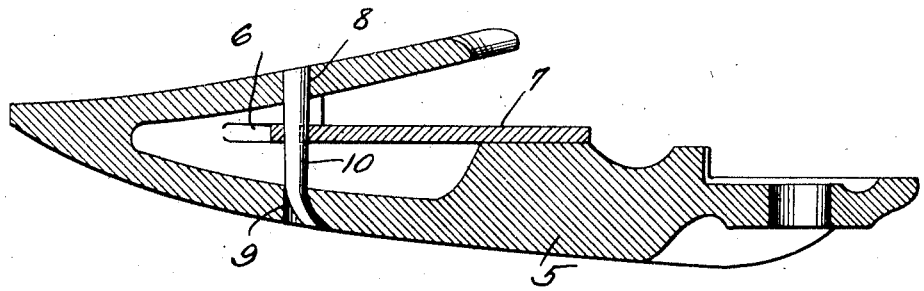
Figure 1 is a longitudinal sectional view through a mower guard showing the ledger plate secured in position.

Referring to the drawing in detail, the reference character 5 indicates the mower guard, the same being provided with a forward cut out portion 6 to accommodate the forward end of the ledger plate 7 which is formed with an opening to register with the openings 8 and 9 of the guard proper.

The opening 8 is slightly larger than the opening 9, so that the tapered pin 10 may fit securely therein, it being understood that the pin is forced through the openings 8 and 9, as well as the opening in the forward end of the ledger plate, to hold the ledger plate against displacement.

Figure 2:
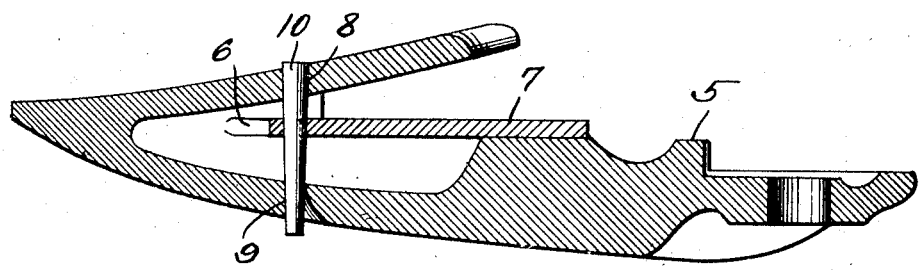
Figure 2 is a longitudinal sectional view through the guard illustrating the pin before the bending operation.
Figure 3:
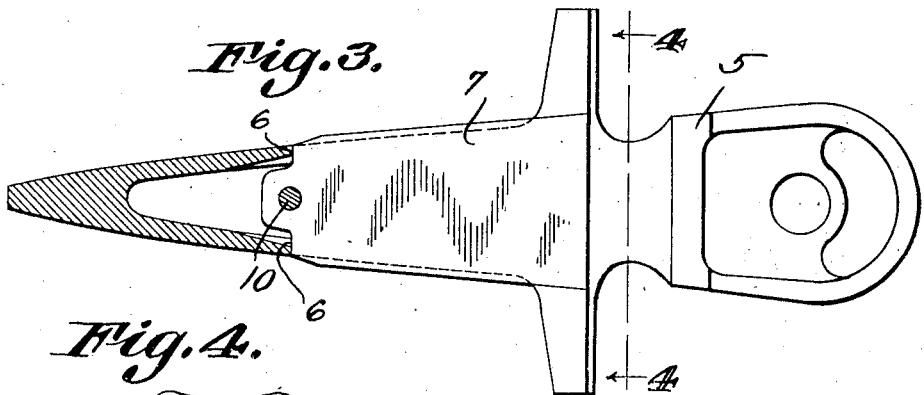
Figure 3 is a sectional view through the forward end of the guard.
Figure 4:
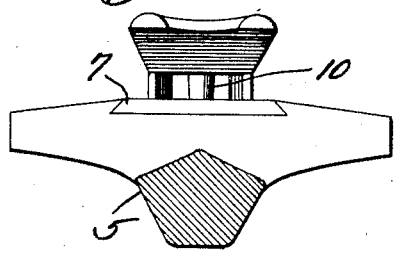
Figure 4 is a vertical sectional view taken on line 4—4 of Figure 3.

As clearly shown by the drawing, the opening 9 is enlarged defining a space to permit the tapered extremity of the pin 10 to be bent rearwardly from a position as shown by Figure 2 to a position as shown by Figure 1, whereupon the pin is securely locked within the opening to insure against the pin working loose while the guard is vibrating when the mower is in operation.

This bending of the pin 10 may be accomplished by directing a blow to the tapered end of the pin by means of a hammer or similar implement sufficiently heavy to cause the pin to bend. The side edges of the ledger plate adjacent to the rear end thereof are beveled to fit within an opening having beveled edges, to the end that when the ledger plate is slid into position, the rear end of the ledger plate will be held against movement.

From the foregoing it will be obvious that due to this construction, a pin may be driven through the forward end of a mower guard to engage within an opening formed in the ledger plate, whereupon the pin may be distorted or bent rearwardly to lock it against movement.

When it is desired to remove the pin, it is only necessary to direct a blow from a hammer to the bent end of the pin to straighten the pin, whereupon the pin may be driven from its position to release the ledger plate.

It will of course be understood that the pin may be driven into the openings of the guard and ledger plate from the upper side of the ledger plate to secure the ledger plate in position without bending the pin.

I claim:

1. In combination with a mower guard having registering openings, one of the openings having an enlarged portion, a pin extended through the openings and adapted to extend through a ledger plate supported by the guard, and one end of the pin extending laterally to lie within the enlarged portion of the opening to lock the pin against movement.

2. In combination with a mower guard and ledger plate supported thereby, a tapered pin driven through the guard and ledger plate to lock the ledger plate against movement, and said pin extending laterally to engage the mower guard to lock the pin against movement.

3. In combination with a mower guard and ledger plate supported thereby, said mower guard and ledger plate having registering openings, a tapered pin driven into the mower guard and extended through the ledger plate, from the upper side of the mower guard, and said pin being distorted adjacent to one end to lock the pin against movement.

In testimony that I claim the foregoing as my own, I have hereto affixed my signature.

CHARLES L. KUCHA.